(12) United States Patent
Jonsson

(10) Patent No.: US 8,009,604 B2
(45) Date of Patent: Aug. 30, 2011

(54) TRANSMISSION-COMPENSATED RADIO CHANNEL QUALITY

(75) Inventor: Anders Jonsson, Taby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 863 days.

(21) Appl. No.: 12/023,910

(22) Filed: Jan. 31, 2008

(65) Prior Publication Data

US 2009/0196237 A1    Aug. 6, 2009

(51) Int. Cl.
*H04B 7/185* (2006.01)
(52) U.S. Cl. ........................................... 370/317
(58) Field of Classification Search .................. None
See application file for complete search history.

(56) References Cited

U.S. PATENT DOCUMENTS

| | | | | |
|---|---|---|---|---|
| 7,386,321 | B2* | 6/2008 | Miyoshi et al. | 455/522 |
| 7,856,210 | B2* | 12/2010 | Karlsson | 455/69 |
| 2003/0108013 | A1* | 6/2003 | Hwang et al. | 370/335 |
| 2004/0001472 | A1* | 1/2004 | Kwak et al. | 370/342 |
| 2005/0181811 | A1* | 8/2005 | Magnusson et al. | 455/458 |
| 2006/0256732 | A1* | 11/2006 | Hamalainen | 370/252 |
| 2007/0008943 | A1* | 1/2007 | Grant et al. | 370/342 |
| 2007/0060187 | A1* | 3/2007 | Englund et al. | 455/522 |

FOREIGN PATENT DOCUMENTS

WO    WO 2006/126954    11/2006

OTHER PUBLICATIONS

3GPP TS 25.308 v8.0.0. (Dec. 2007), $3^{rd}$ Generation Partnership Project; Technical Specification Group Radio Access Network; High Speed Downlink Packet Access (HSDPA); Overall description; Stage 2 (Release 8), pp. 1-50.
International Preliminary Report on Patentability, mailed Aug. 12, 2010, in corresponding International Application No. PCT/SE2009/050018.

* cited by examiner

*Primary Examiner* — Anh-Vu Ly
(74) *Attorney, Agent, or Firm* — Nixon & Vanderhye P.C.

(57) ABSTRACT

A channel quality of a radio channel between a transmitter and a receiver is detected by the receiver. The channel quality is compensated for an affect of a transmission on the radio channel when the receiver detected the channel quality or an affect of a future transmission on the radio channel. In a preferred example embodiment, the channel quality is compensated for both affects if present. The compensated channel quality is then used to determine one or more parameters for transmission from the transmitter to the receiver over the radio channel, e.g., an amount of data to be transmitted, a transmission power, and/or a transmission time period.

14 Claims, 6 Drawing Sheets

TRANSMISSION-COMPENSATED RADIO CHANNEL QUALITY

TECHNICAL FIELD

The technical field relates to radio communications and to adjusting one or more transmission parameters based on a detected radio channel quality.

BACKGROUND

An objective of the technology in this application is to improve transmission throughput over a radio channel and at the same time maintain a desired transmission error target, like bit or block error rate, by adjusting the channel quality estimate as reported by the receiver. A problem is that the channel quality estimate provided by the receiver often is not accurate, i.e., the radio channel is really better or worse than the channel quality estimate, which means that the response by the transmitter is not optimal, i.e., it overestimates the channel quality resulting in too many errors at the receiver or it underestimates the channel resulting in underutilized transmission capacity.

FIG. 1 illustrates an example cellular radio communications system containing three cells C1, C2, and C3 for purposes of illustration. Each cell has its own radio base station BS1, BS2, and BS3, respectively, for purposes of illustration. In cell C2, a mobile radio terminal, referred to as user equipment 1 (UE1), is receiving a desired communication from its base station BS2. In addition, UE1 is perceiving additional transmissions not targeting UE1 as interference with respect to the desired downlink communication from the base station BS2 to UE1. The interfering signals may be, for example, transmissions from adjacent cell base stations BS1 and BS2, transmissions from UEs in the same cell C2, i.e., UE3, or transmissions from UEs in adjacent cells, i.e., UE2. All of these interfering signals can adversely affect the ability of UE1 to accurately estimate the radio channel quality from base station BS2 to UE1. The inventor recognized the possibility to compensate for one type of interference that is overlooked in the channel quality detection process, namely, interference caused by desired downlink transmissions from base station BS2 to UE1.

Many high speed wireless data systems employ a method of feedback to allow the sending node to make an estimate of the channel quality and based on this make an estimate on how much data can be sent to a user given the power available and the channel quality as reported by the user. Consider as an example, the high speed-downlink shared channel (HS-DSCH) in Wideband Code Division Multiple Access (WCDMA) systems like the Universal Mobile Telecommunications System (UMTS), a channel quality indicator (CQI) is reported by the user equipment (UE) to the UMTS Terrestrial Radio Access Network (UTRAN). The CQI information is contained in the last two slots of the High Speed Dedicated Control Channel (HS-DPCCH) sub frame. These CQI reports are based on measurements on the Common Pilot Channel (CPICH) transmitted by the base station and are reported by the UE at a predefined rate defined by the UTRAN. The CQI in this example represents the instantaneous channel conditions in a predefined 3-time slot interval ending one time slot prior to the CQI transmission.

The accuracy of this CQI estimate has a major impact on the Hybrid Automatic Retransmission Request (HARQ) Block Error Ratio or Rate (BLER) in the UMTS system because a deviation from the actual conditions will either lead to an over-estimation or under-estimation of the CPICH and HS-DSCH conditions, and more generally channel conditions, by the base station transmitter as explained more generally above. The inventor recognized that there are a number of sources that affect the accuracy of the CQI including CQI reporting delay, inter-cell interference, and intra-cell interference. Of particular concern to the inventor is the effect on the CQI report accuracy caused by HS-DSCH transmissions occurring in the cell serving the reporting UE.

In addition to the interference caused by the downlink transmission dedicated to one UE, a similar effect occurs when data is sent to more than one UE in a given transmission time interval (TTI). In WCDMA systems, multiple user transmission by the base station is accomplished using a technique called code multiplexing. The HS-DSCH transmission scheduler shares the radio resources available for transmission over the HS-DSCH by allocating the available spreading codes and transmission power for the HS-DSCH to multiple UEs. The base station uses the CQI from each UE to help determine how much data to send to each UE over the HS-DSCH. So the accuracy of the reported CQIs is of major importance to control BLER and to make efficient use of the HS-DSCH resources.

Currently, the HS-DSCH scheduler does not take into account if the CQI as reported from a UE was determined during a TTI when there was HS-DSCH transmission in the cell serving the reporting UE. Since the radio conditions in a cell are always less than perfectly orthogonal, such a coincidental transmission may well be detected as interference by the UE detecting the channel quality of the pilot transmission in the same base station cell as the HS-DSCH. Nor is the multiplexing transmission to multiple UEs in a code multiplexed implementation taken into account.

Another issue that should be accounted for is the change in transmission status that may occur from the time the UE estimated and reported the CQI until the transmitting node sends data to the UE. For example, if the HS-DSCH scheduler is planning to transmit during an upcoming transmission time interval (TTI), it should take into account both the actual interference conditions that prevailed when the CQI was measured by the UE and an assessment of the amount of interference the planned transmission will cause to the UE due to less than perfectly orthogonal radio conditions. Thus, if there is a difference in the transmission power on the HS-DSCH between the time the UE measured the CQI and at the time of transmission, then the channel conditions will either be over-estimated or under-estimated if not corrected. If the HS-DSCH transmission power is increased at the planned time of transmission, then there is a risk that the transmission will not be correctly decoded by the UE because the interference has increased as compared to the time the UE sent the CQI report. Conversely, if the HS-DSCH transmission power decreases, then the scheduler will overestimate the interference effect and allocate too much power to the HS-DSCH transmission (or choose a smaller transport block than necessary) leading to an inefficient use of the HS-DSCH channel.

SUMMARY

The technology described below overcomes the problems and issues described in the background. A channel quality of a radio channel between a transmitter and a receiver is detected by the receiver. The channel quality is compensated for an affect of a transmission on the radio channel when the receiver detected the channel quality or an affect of a future transmission over the radio channel. In a preferred example embodiment, the channel quality is compensated for both affects if present. The compensated channel quality is then used to determine one or more parameters for transmission from the transmitter to the receiver over the radio channel, e.g., an amount of data to be transmitted, a transmission power, and/or a transmission time period. The channel quality may also be compensated for a bias associated with the receiver in detecting the channel quality.

In one example implementation, the transmitter is a base station in a cellular communications network, the receiver is a mobile radio terminal, and the radio channel is a downlink channel from the base station to the mobile radio terminal, e.g., a high speed-downlink shared channel (HS-DSCH). The base station determines a total HS-DSCH transmission power when the mobile radio terminal detected the channel quality and/or when a future transmission on the HS-DSCH is planned and determines the compensated channel quality based on the total HS-DSCH transmission power. In an implementation where the HS-DSCH is code multiplexed, a fraction of the total HS-DSCH transmission power assigned for a particular transmission time interval (TTI) is determined when the mobile radio terminal detected the channel quality and/or when a transmission on the HS-DSCH during a future TTI is planned. The compensated channel quality is then determined based on the fraction of the total HS-DSCH transmission power.

DETAILED DESCRIPTION

In the following description, for purposes of explanation and non-limitation, specific details are set forth, such as particular nodes, functional entities, techniques, protocols, standards, etc. in order to provide an understanding of the described technology. In other instances, detailed descriptions of well-known methods, devices, techniques, etc. are omitted so as not to obscure the description with unnecessary detail.

It will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be embodied in computer readable medium and so executed by a computer or processor, whether or not such computer or processor is explicitly shown. The functions of the various elements including functional blocks may be provided through the use of dedicated electronic hardware as well as electronic circuitry capable of executing computer program instructions in association with appropriate software.

It will be apparent to one skilled in the art that other embodiments may be practiced apart from the specific details disclosed below. All statements reciting principles, aspects, and embodiments, as well as specific examples, are intended to encompass both structural and functional equivalents. Such equivalents include both currently known equivalents as well as equivalents developed in the future, i.e., any elements developed that perform the same function, regardless of structure.

Figure 1:
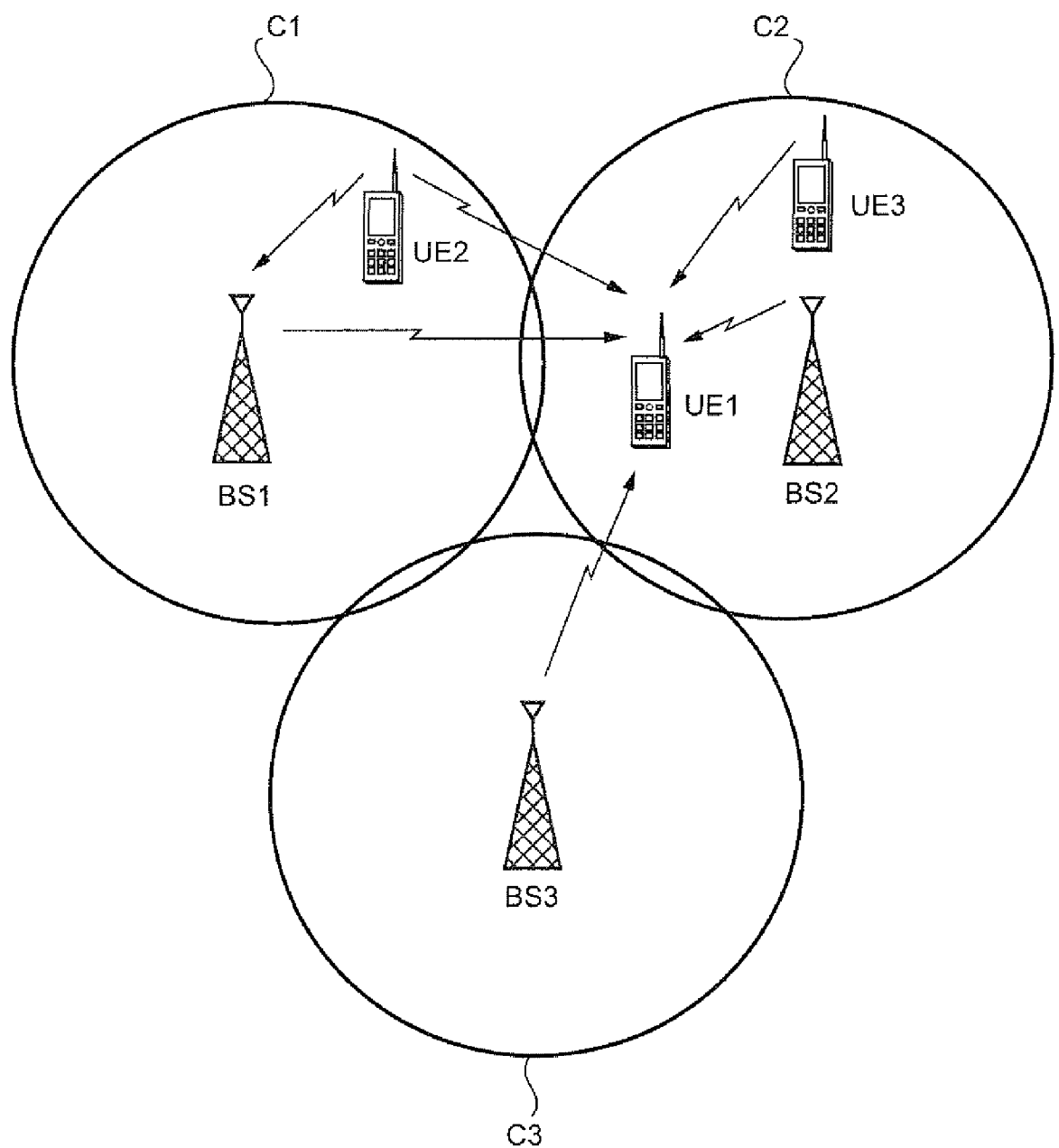
FIG. 1 is a conceptual diagram of an example cellular radio communication system.
Figure 2:
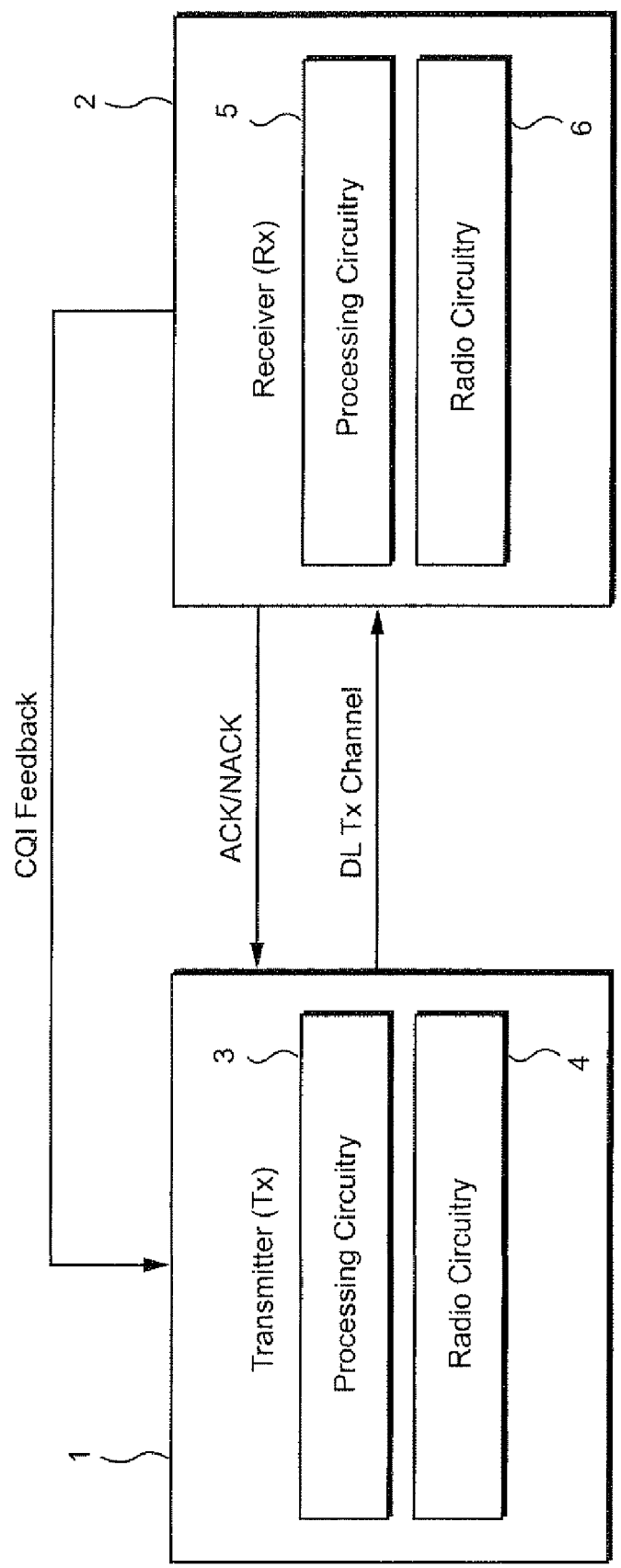
FIG. 2 is a function block diagram of an example radio communication system.

FIG. 2 is a function block diagram of an example radio communication system. A transmitter (Tx) 1 communicates with a radio receiver (Rx) 2 over a downlink radio transmission channel (DL Tx channel). The transmitter includes processing circuitry 3 and radio circuitry 4. The receiver 2 also includes processing circuitry 5 and radio circuitry 6. The processing circuitry 5 and radio circuitry 6 detects whether data packets received over the downlink transmission channel from the transmitter 1 are accurately received or not. If accurately received, an acknowledgement (ACK) signal is sent back to the transmitter by the receiver. But if a packet is not received or is erroneously received, a negative (NACK) signal is sent by the receiver back to the transmitter. In addition, the processing circuitry 5 and the radio circuitry 6 determine a channel quality indicator (CQI) associated with the channel quality detected by the receiver to over the downlink transmission channel. Non-limiting example channel quality indicators include received signal strength, number of bit errors per data unit, number of block errors per data block, signal-to-interference or noise ratio, etc. The channel quality indicator is fed back to the transmitter to permit the transmitter to adjust one or more transmission parameters for a next transmission to the receiver over the downlink transmission channel, e.g., adjust the transmission power level, the amount of data to be transmitted, and/or a transmission time period.

Figure 3:
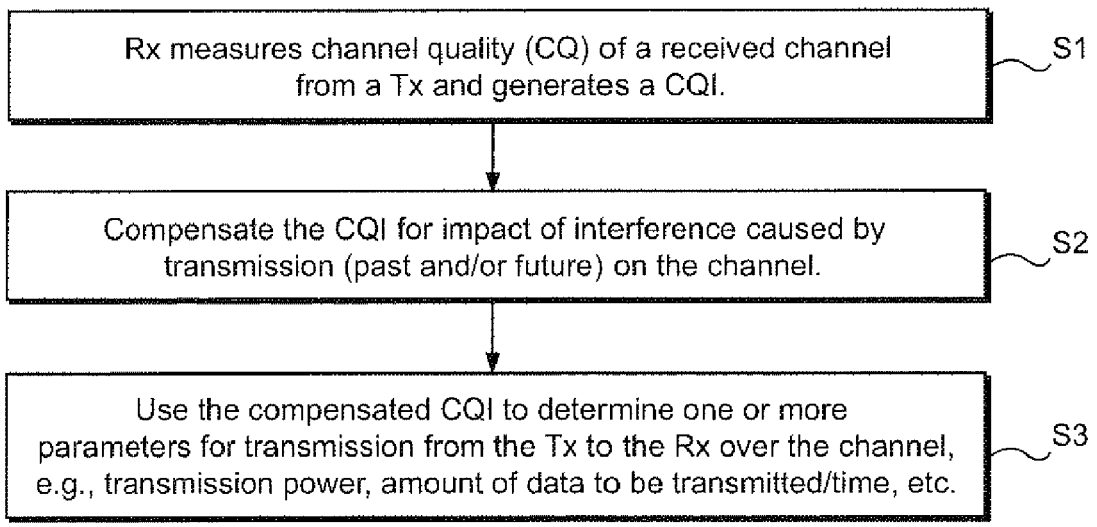
FIG. 3 is a flow chart diagram illustrating non-limiting, example procedures for compensating a channel quality value.

FIG. 3 is a flow chart diagram illustrating non-limiting, example procedures for compensating a channel quality value such as the CQI feedback from the receiver 2 in FIG. 2. The receiver measures the channel quality of a received signal from the transmitter and generates a corresponding CQI (step S1). The CQI value is compensated specifically for the impact of interference caused by past and/or future transmission by the transmitter to the receiver (step S2). The compensated CQI is then used to determine one more parameters for transmission from the transmitter to the receiver over that channel (step S3).

Figure 4:
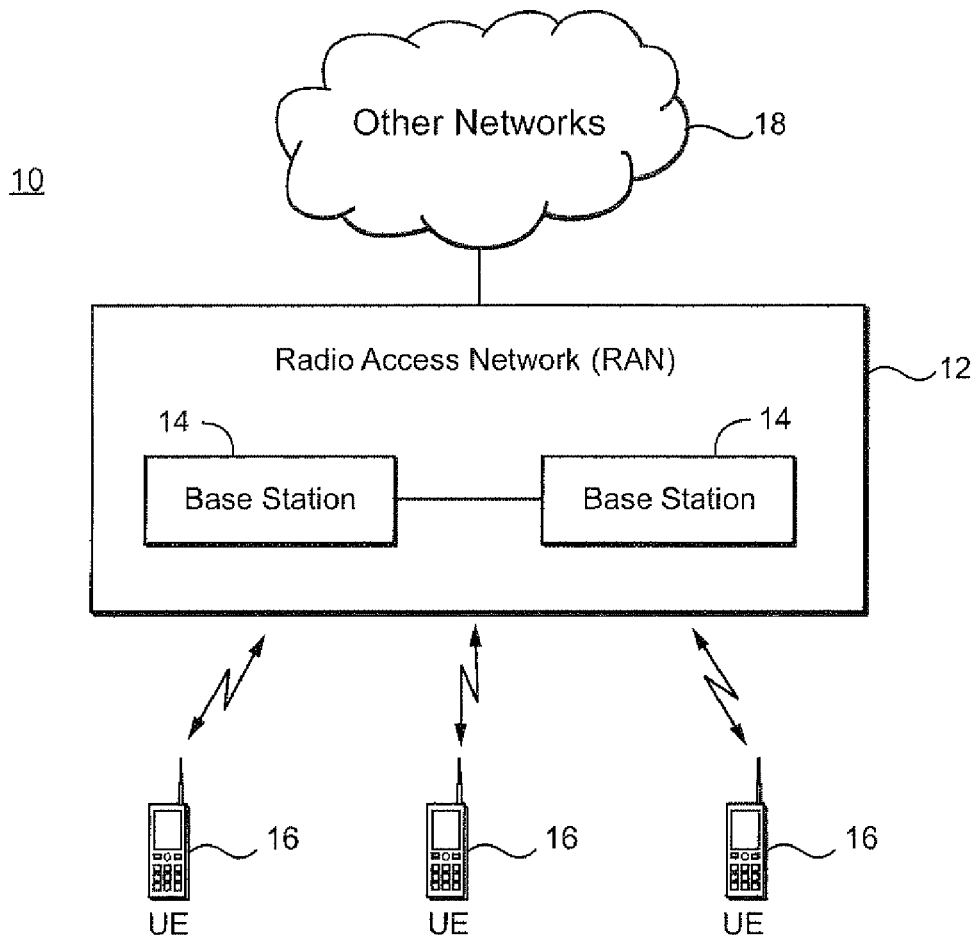
FIG. 4 is a function block diagram of a general mobile communications system.

One non-limiting example of a general cellular communications system 30 is shown FIG. 4. A radio access network (RAN) 12 is coupled to other networks such as one or more core networks coupled to the PSTN, ISDN, or the Internet, etc. The RAN 12 includes base stations 14 that communicate with each other, e.g., for handover and other coordinated functions. The base stations 14 communicate over the radio/air interface with mobile radio terminals also referred to as user equipment terminals (UEs) 16. The term mobile radio terminal encompasses any personal wireless communications device such as (but not limited to) a cell phone, a personal digital assistant (PDA) or organizer, and a laptop computer with built-in wireless access or a wireless accessory.

In the cellular system 10 shown in FIG. 4, the transmitter in this example corresponds to a base station 14 and the receiver corresponds to the UE 16. It has been observed that UEs may have a bias associated with sending channel quality estimates back to the base station. A UE uses its receiver and an algorithm to gauge the channel quality. Because both the receiver sensitivity and algorithm are implementation-specific, the actual channel quality assessment provided by the UE may vary from what another similarly situated UE might provide. Moreover, different UE vendors may produce UEs with different characteristics. Some UEs may be better than others in making a correct assessment of the channel conditions, and this will be reflected in the accuracy of the CQI report. Hence, if such a UE bias is a problem, then the base station preferably compensates the CQI in order to improve the accuracy of the reported CQI.

But more importantly, the CQI compensation compensates for past and/or future radio transmission from the base station to the UE. Preferably, the channel quality is compensated for the effect of a transmission on that radio channel at the time the receiver detected (in the part) the channel quality as well as an effect of a future transmission over the radio channel to the UE. A detailed non-limiting, example is now described in the context of a UMTS type cellular system that employs a high speed-downlink shared channel (HS-DSCH) to communicate with multiple UEs.

Figure 5:
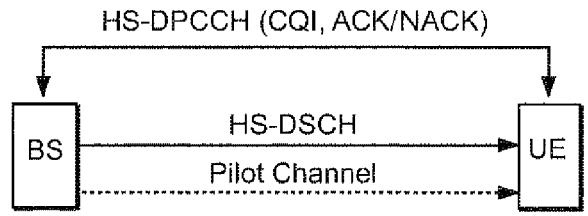
FIG. 5 is a diagram of showing a non-limiting example of channel quality detection and reporting in a cellular system that uses a high speed control channel and a high speed shared data channel.

FIG. 5 is a diagram showing a non-limiting example of channel quality detection and reporting in a cellular system that uses a high speed dedicated control channel (HS-DPCCH) and a HS-DSCH. In this example, the base station broadcasts signals over a pilot channel (CPICH) which is detected by UEs in and adjacent to the cell being serviced by that base station. The UE detects the channel quality of the received pilot signal and generates a CQI which it returns to the base station over the HS-DPCCH. The UE also provides the base station with ACK/NACK information with respect to packets accurately received (ACK) or not accurately received (NACK) over the HS-DSCH.

Figure 6:
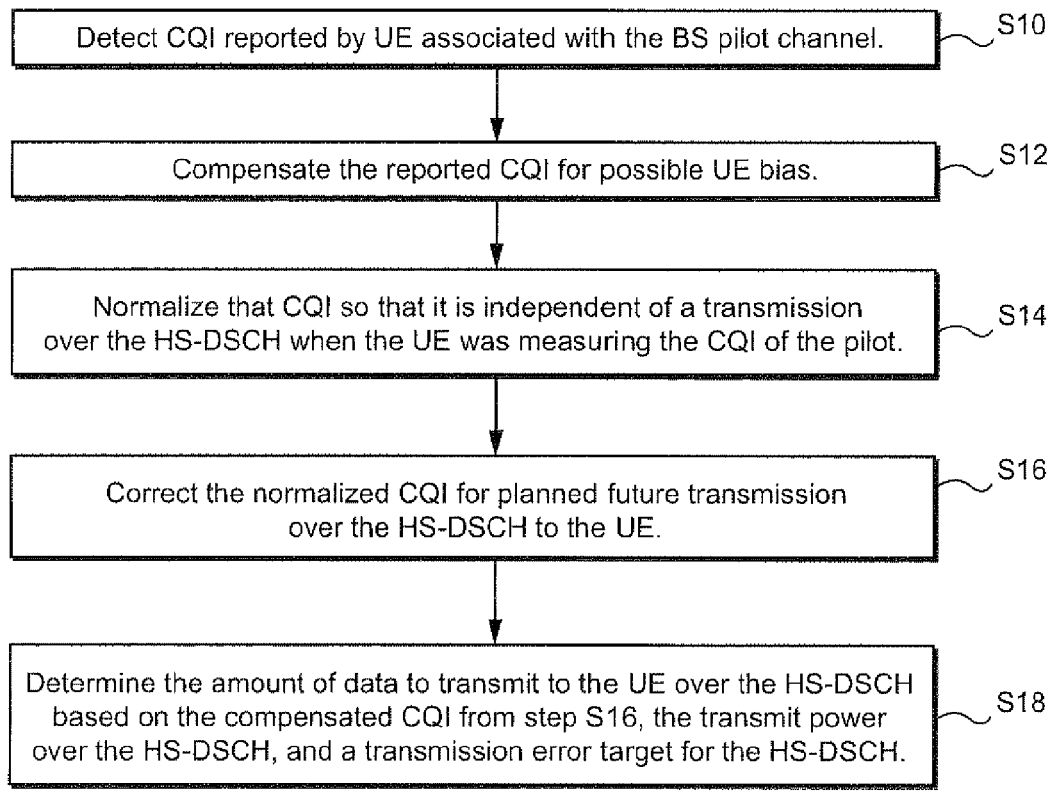
FIG. 6 is a flow chart diagram illustrating non-limiting, example procedures for compensating a UE channel quality value for a past downlink transmission and a future downlink transmission from the serving base station received by the UE.

FIG. 6 is a flow chart diagram illustrating non-limiting, example procedures for compensating a UE channel quality value for a past downlink transmission over the HS-DSCH to the UE and a future downlink transmission over the HS-DSCH to the UE. The base station detects the CQI reported by the UE that is associated the HS-DSCH, which in the example of FIG. 5, is the common pilot channel HS-DPCCH (step S10). The reported CQI may then be compensated for possible UE bias, if desired, for the reasons explained above (step S12). The CQI value is then normalized in a sense so that it is substantially independent of whether there was a transmission over the HS-DSCH in the serving cell when the UE was measuring the CQI of the pilot (step S14). The normalized CQI value is also preferably corrected for any planned future transmission over the HS-DSCH in the serving cell (step S16). The base station then determines the amount of data to transmit to the UE over the HS-DSCH based on the compensated CQI from step S16, the transmit power over the HS-DSCH, and a transmission error target for the HS-DSCH (step S18).

Figure 7:
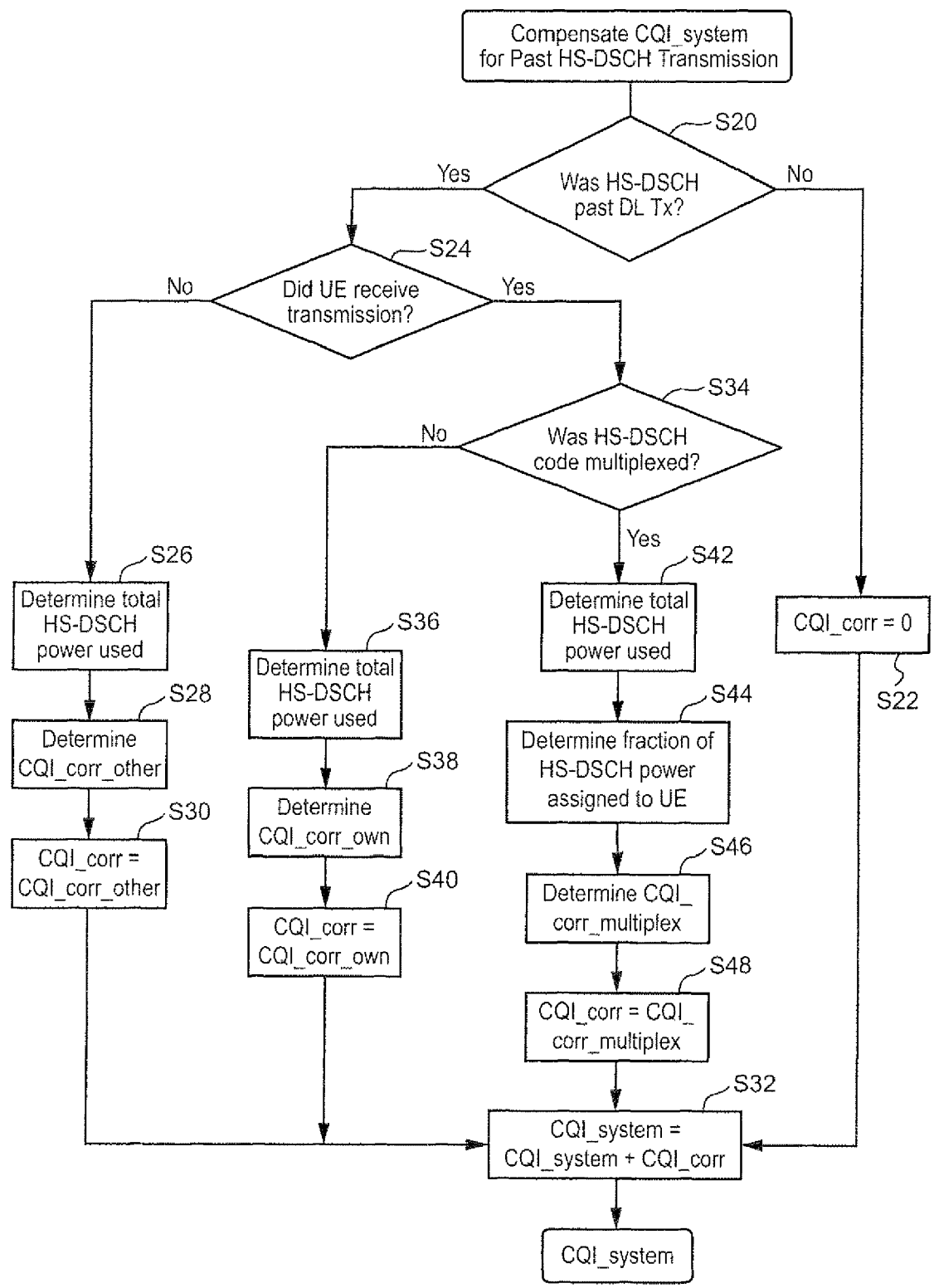
FIG. 7 is a flow chart diagram illustrating non-limiting, example procedures for compensating a UE channel quality value for a past downlink transmission from the serving base station received by the UE.

FIG. 7 is a flow chart diagram illustrating non-limiting, example procedures for compensating a UE channel quality value for a past downlink transmission to the UE over the HS-DSCH while the UE was making a signal quality estimation of the base station's pilot signal. The flow chart is entitled "Compensate CQI_System for Past HIS-DSCH Transmission." A decision is made in step S20 whether there was past downlink transmission over the HS-DSCH. If not, the variable CQI_corr is set to 0 (step S22) and control proceeds to step S32. Otherwise, a decision is made in step S24 whether the UE received the HS-DSCH transmission during the transmission time interval (TTI) under analysis. If the UE did not receive a transmission over the HS-DSCH during that TTI, then the total HS-DSCH power for this past TTI transmission is used to determine a suitable correction factor CQI_corr_other (step S26). The correction factor CQI_corr_other may be determined in any suitable fashion (step S28).

One non-limiting example algorithm is as follows:

$$CQI\_corr\_other = C1 \times Power_{HS\text{-}DSCH}/Power\ RBS + C2 \times CQI_{system}$$

where C1 and C2 are predetermined constants, $Power_{HS\text{-}DSCH}$ is the power assigned to HS-DSCH, Power RBS the power capability of the base station, and $CQI_{system}$ is the input $CQI_{system}$ to the algorithm. The variable CQI_corr is equal to CQI_corr_other (step S30) and control proceeds to step 32.

If the UE received a transmission of the HS-DSCH during that TTI, a decision is made whether that transmission was code-multiplexed during the TTI (step S34). If the UE was the sole recipient then there was no code multiplexing during that TTI. Accordingly, the total HS-DSCH power is determined (step S36) and used to determine a suitable correction factor CQI_corr_own (step S38). Any suitable correction factor determination procedure may be employed.

One non-limiting example is as follows:

$$CQI\_corr\_own = C3 \times Power_{HS\text{-}DSCH}/Power_{RBS} + C4 \times CQI_{system}$$

where C2 and C4 are predetermined constants, $Power_{HS\text{-}DSCH}$ is the power assigned to HS-DSCH, $Power_{RBS}$ is the power capability of the base station, and $CQI_{system}$ is the input $CQI_{system}$ to the algorithm. The variable CQI_corr is then set to CQI_corr_own (step S40) and control proceeds to step 32.

If code multiplexing was employed, then the UE only received part of the HS-DSCH transmission during the TTI. The total HS-DSCH power used during that TTI is determined (step S42), and then a fraction of the HS-DSCH power assigned to that UE during that TTI is determined (step S44). The variable CQI_corr_multiplex is determined (step S46) using any suitable formula or procedure.

One non-limiting example is as follows:

$$CQI\_corr\_multiplex = [C5 \times Power_{UE}/Power_{HS\text{-}DSCH} + C6 \times (Power_{HS\text{-}DSCH} - Power_{UE})/Power_{HS\text{-}DSCH}] \times [Power_{HS\text{-}DSCH}/Power_{RBS}] + C7 \times CQI_{system\_old}$$

where C5, C6, and C7 are constants, and $Power_{UE}$ is the power assigned to $UECQI_{system\_old}$. The constants C1 to C7 are preferably configurable per cell and may either be set to the same value in the whole network or set to different values in different cells to account for different environments, e.g., urban or rural sites. The constants C2 and C4 may be adjusted based on detected channel conditions at the time the UE measured and compiled the CQI report that the system used to determine the CQI_system value to be fed into the algorithm.

The variable CQI_corr is then set equal to the CQI_corr_multiplex value (step S48) and control proceeds to step 32 where the compensated CQI value corresponding to CQI_system equals the sum of CQI_system plus CQI_corr. Again, the above example is non-limiting. Other formulas and procedures for determining the CQI_system value may be used to compensate the CQI system value for interference caused by the HS-DSCH transmission to the UE in that cell.

Figure 8:
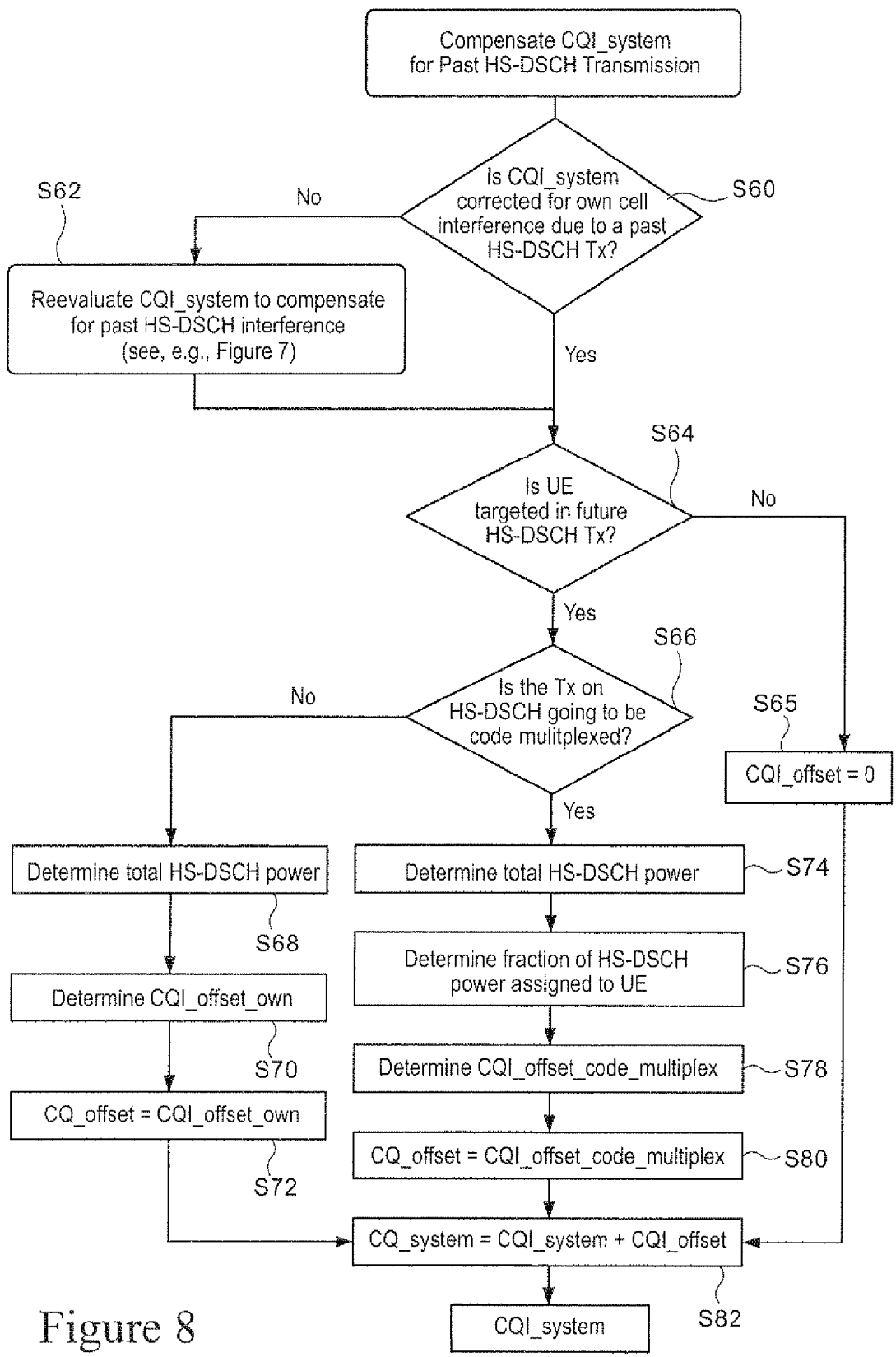
FIG. 8 is a flow chart diagram illustrating non-limiting, example procedures for compensating a UE channel quality value for a future downlink transmission from the serving base station received by the UE.

FIG. 8 is a flow chart diagram illustrating non-limiting, example procedures for compensating a UE channel quality value for a future downlink transmission from the base station over the HS-DSCH channel for receipt by the UE. The flow chart is entitled "Compensate CQI-System for Past HS-DSCH Transmission." As will be explained, the compensation factor to be added to the CQI_system value is referred to as the CQI_offset.

A decision is made at step S60 whether the CQI_system value has been corrected for its own cell interference due to a past HS-DSCH transmission. If not, the CQI_system value is preferably compensated for past HS-DSCH interference (step S62) using for example but not limited to procedures outlined in FIG. 7 and described above. Control proceeds to step S64 to evaluate whether an HS-DSCH scheduler in the base station plans to target the UE in an HS-DSCH transmission, e.g., during a next TTI. If not, the CQI_offset is set to 0 (step S65) and control proceeds to step S82. Otherwise, another decision is made at step S66 to determine whether the transmission over the HS-DSCH is going to be code multiplexed. If not, and the UE is to be the sole recipient of the HS-DSCH transmission during that future TTI, the total HS-DSCH transmission power to be used for that future TTI transmission is determined (step S68), and it is used to determine the variable CQI_offset_own using any suitable algorithm or procedure.

One non-limiting example algorithm is as follows:

$$\text{CQI\_offset\_own} = C1 \times \text{Power}_{HS-DSCH}/\text{Power}_{RBS} + C3 \times \text{CQI}_{system}$$

where C1 and C3 are constants, $\text{Power}_{HS-DSCH}$ is the power assigned to HS-DSCH, $\text{Power}_{RBS}$ is the power capability of the base station, and $\text{CQI}_{system}$ is the input $\text{CQI}_{system}$ to the algorithm.

The variable CQ_offset is then set to CQI_offset_own (step S72), and control proceeds to step S82.

But if there is code multiplexing employed on the HS-DSCH for the next TTI so that the UE will only receive part of the power allocated for the HS-DSCH transmission, then the CQI_offset value is estimated based on the quota of power and spreading codes assigned to transmission to the UE and the power and codes assigned to the other UEs being code multiplexed during that TTI. Both the total HS-DSCH power to be employed during that TTI is determined and the fraction of that HS-DSCH power to be assigned to the UE are determined (steps S76 and S76). The value CQI_offset_code_multiplex is then determined in step S78 using any suitable procedure or algorithm.

On non-limiting example algorithm is as follows:

$$\text{CQI\_offset\_code\_multiplex} = [C1 \times \text{Power}_{UE}/\text{Power}_{HS-DSCH} + C2 \times (\text{Power}_{HS-DSCH} - \text{Power}_{UE})/\text{Power}_{HS-DSCH}] \times [\text{Power}_{HS-DSCH}/\text{Power}_{RBS}] + C3 \times \text{CQI}_{system}$$

where C1, C2, and C3 are constants and Power UE is the power assigned to the UE. The constants C1 and C2 may be configurable per cell and could either be set to the same value in the whole network or set to different values in different cells to account for different environments such as urban or rural sites. The constant C3 can be adjusted based on the UE's detected channel quality if needed. CQ_offset is then set equal to CQI_offset_code_multiplex (step S80), and control proceeds to step S82 which defines the variable CQ_system which is compensated for the future TTI transmission as being equal to the sum of the CQI_system and the CQI_offset (step S82).

The technology described above provides better channel adaptation by taking into account the effects of interference from transmissions in the cell serving the UE. Because the adaptation compensates for the past interference effect that influenced the UE when it compiled the channel estimate and/or for the future effects of interference, a more accurate channel adaptation takes place which results in better utilization of the available resources.

None of the above description should be read as implying that any particular element, step, range, or function is essential such that it must be included in the claims scope. The scope of patented subject matter is defined only by the claims. The extent of legal protection is defined by the words recited in the allowed claims and their equivalents. All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. No claim is intended to invoke paragraph 6 of 35 USC §112 unless the words "means for" or "step for" are used. Furthermore, no embodiment, feature, component, or step in this specification is intended to be dedicated to the public regardless of whether the embodiment, feature, component, or step is recited in the claims.

The invention claimed is:

1. A method comprising:
   establishing a radio channel between a transmitter and a receiver, wherein the transmitter is a base station in a cellular communications network, the receiver is a mobile radio terminal, and the radio channel is a high speed-downlink shared channel (HS-DSCH);
   determining a channel quality detected by the receiver that is associated with the radio channel;
   compensating the channel quality for an affect of a transmission on the radio channel when the receiver detected the channel quality or an affect of a future transmission on the radio channel;
   determining a total HS-DSCH transmission power when the mobile radio terminal detected the channel quality or when a future transmission on the HS-DSCH is planned;
   determining the compensated channel quality based on the total HS-DSCH transmission power; and
   deciding whether the HS-DSCH is code multiplexed, and if so, determining a fraction of the total HS-DSCH transmission power when the mobile radio terminal detected the channel quality or when a future transmission to the mobile radio terminal on the HS-DSCH is planned, and determining the compensated channel quality based on the fraction of the total HS-DSCH transmission power.

2. The method in claim 1, further comprising:
   compensating the channel quality for an affect of a transmission on the radio channel when the receiver detected the channel quality.

3. The method in claim 1, further comprising:
   compensating the channel quality for an affect of a future transmission on the radio channel.

4. The method in claim 1, further comprising:
   compensating the channel quality for an affect of a transmission on the radio channel when the receiver detected the channel quality and an affect of a future transmission on the radio channel.

5. The method in claim 1, further comprising:
   using the compensated channel quality to determine one or more parameters for transmission from the transmitter to the receiver over the radio channel.

6. The method in claim 5, wherein the one or more parameters includes an amount of data to be transmitted, a transmission power, and/or a transmission time period.

7. The method in claim 1, further comprising:
compensating the channel quality for a bias associated with the receiver in detecting the channel quality.

8. Apparatus comprising:
a radio transmitter for transmitting signals over a radio channel and receiving from a receiver channel quality information detected by the receiver associated with the radio channel, wherein the radio transmitter is a base station in a cellular communications network, the receiver is a mobile radio terminal, and the radio channel is a high speed-downlink shared channel (HS- DSCH), and electronic circuitry configured to
compensate the received channel quality for an affect of a transmission on the radio channel when the receiver detected the channel quality or an affect of a future transmission on the radio channel,
determine a total HS-DSCH transmission power when the mobile radio terminal detected the channel quality or when a future transmission on the HS-DSCH is planned,
determine the compensated channel quality based on the total HS-DSCH transmission power, and
decide whether the HS-DSCH is code multiplexed, and if so, determine a fraction of the total HS-DSCH transmission power when the mobile radio terminal detected the channel quality or when a future transmission on the HS-DSCH to the mobile radio terminal is planned, and
determine the compensated channel quality based on the fraction of the total HS-DSCH transmission power.

9. The apparatus in claim 8, wherein the electronic circuitry is configured to compensate the channel quality for an affect of a transmission on the radio channel when the receiver detected the channel quality.

10. The apparatus in claim 8, wherein the electronic circuitry is configured to compensate the channel quality for an affect of a future transmission on the radio channel.

11. The apparatus in claim 8, wherein the electronic circuitry is configured to compensate the channel quality for an affect of a transmission on the radio channel when the receiver detected the channel quality and an affect of a future transmission on the radio channel.

12. The apparatus in claim 8, wherein the electronic circuitry is configured to use the compensated channel quality to determine one or more parameters for transmission from the radio transmitter to the receiver over the radio channel.

13. The apparatus in claim 12, wherein the one or more parameters includes an amount of data to be transmitted, a transmission power, and/or a transmission time period.

14. The apparatus in claim 8, wherein the electronic circuitry is configured to compensate the channel quality for a bias associated with the receiver in detecting the channel quality.

* * * * *

UNITED STATES PATENT AND TRADEMARK OFFICE
CERTIFICATE OF CORRECTION

PATENT NO.      : 8,009,604 B2
APPLICATION NO. : 12/023910
DATED           : August 30, 2011
INVENTOR(S)     : Jonsson Page 1 of 1

It is certified that error appears in the above-identified patent and that said Letters Patent is hereby corrected as shown below:

In Fig. 8, Sheet 6 of 6, for Tag "S66", in Line 3, delete "mulitplexed?" and insert -- multiplexed? --, therefor.

In Column 1, Line 55, delete "Dedicated" and insert -- Dedicated Physical --, therefor.

In Column 1, Line 57, delete "Pilot" and insert -- Pilot Indicator --, therefor.

In Column 5, Line 31, delete "dedicated" and insert -- dedicated physical --, therefor.

In Column 5, Line 66, delete "HIS-DSCH" and insert -- HS-DSCH --, therefor.

In Column 6, Lines 12-13, delete "/Power RBS+C2×$CQI_{system}$" and insert -- /$Power_{RBS}$+C2×$CQI_{system}$ --, therefor.

In Column 6, Line 16, delete "Power RBS" and insert -- $Power_{RBS}$ --, therefor.

In Column 7, Line 50, delete "Power UE" and insert -- $Power_{UE}$ --, therefor.

In Column 9, Line 4, in Claim 8, delete "Apparatus" and insert -- An apparatus --, therefor.

In Column 9, Line 13, in Claim 8, delete "to" and insert -- to: --, therefor.

Signed and Sealed this
Thirty-first Day of July, 2012

David J. Kappos
*Director of the United States Patent and Trademark Office*